No. 856,697. PATENTED JUNE 11, 1907.
W. W. & H. H. HARE.
MOWER.
APPLICATION FILED APR. 16, 1906.
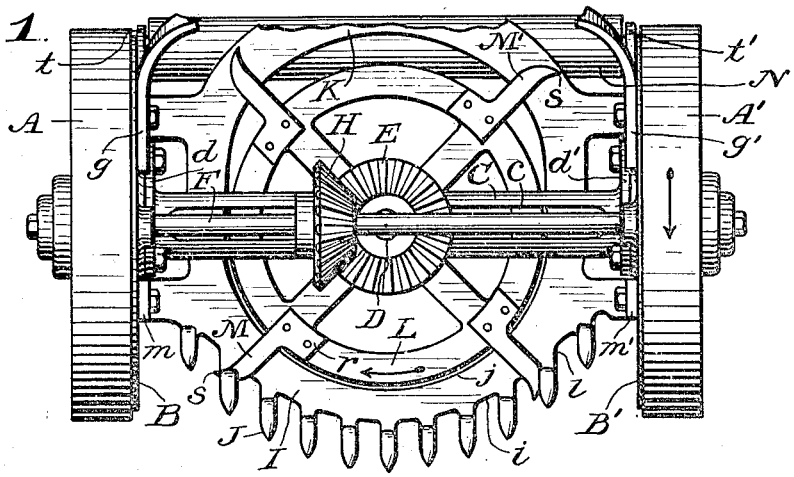
Fig. 1.
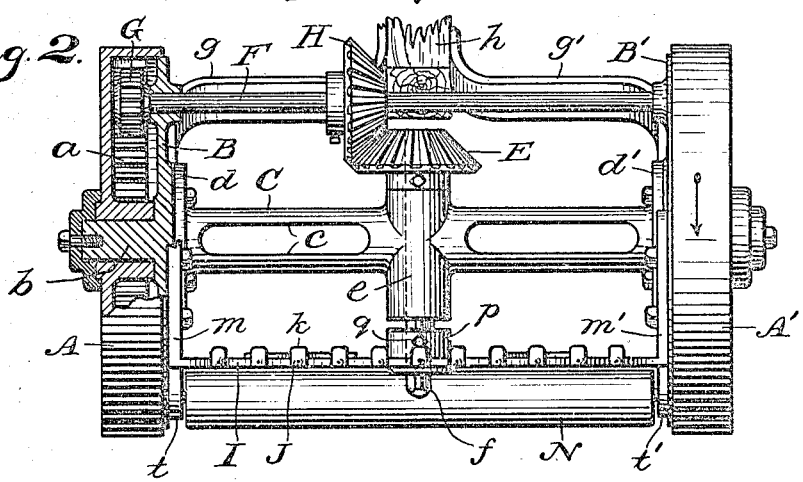
Fig. 2.
Fig. 3.
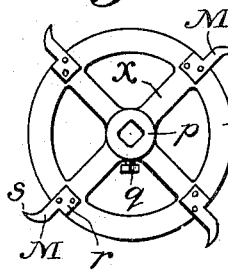
Fig. 4.
Fig. 5.
WITNESSES:
Louis Pitt.
Stella Snider.
INVENTORS:
W. W. Hare,
H. H. Hare,
BY
E. T. Silvius,
ATTORNEY.

UNITED STATES PATENT OFFICE.

WILLIAM W. HARE AND HENRY H. HARE, OF NOBLESVILLE, INDIANA, ASSIGNORS OF ONE-THIRD TO ALBERT GARVER, OF OTISCO, INDIANA.

MOWER.

No. 856,697.  Specification of Letters Patent.  Patented June 11, 1907.

Application filed April 16, 1906. Serial No. 311,869.

*To all whom it may concern:*

Be it known that we, WILLIAM W. HARE and HENRY H. HARE, citizens of the United States, residing at Noblesville, in the county of Hamilton and State of Indiana, have invented new and useful Improvements in Mowers; and we do declare the following to be a full, clear, and exact description of the invention, reference being had to the accompanying drawings, and to the letters and figures of reference marked thereon, which form a part of this specification.

This invention relates to machines that are designed to mow grass or other vegetation, and has reference more particularly to lawn mowers.

Objects of the invention are to provide a mowing machine of improved construction, which may be made of simple parts that may be cheaply manufactured, not liable to disorders, and adapted to be operated easily; to provide a mower with improved knives or cutters that will not be troublesome in the matter of keeping them sharp; and to provide a substantial and economical mower.

With the above-mentioned and minor objects in view, the invention consists in a mowing machine having a novel curved finger-bar, a circular rotary sickle-bar or sickle-holder, and a novel form of sickle or cutter carried by the sickle-bar; and, the invention consists further of the novel parts of the machine, and in the combinations and arrangements of parts, as hereinafter particularly described and pointed out in the appended claims.

Referring to the drawings, Figure 1 is a top plan of the improved mower in the form of a hand-operated machine, the handle being broken away; Fig. 2, a front elevation thereof with parts broken away; Fig. 3, a top plan of the circular sickle-bar and sickles thereon; Fig. 4, a vertical central sectional view of the mower; and, Fig. 5, a fragmentary sectional view of the finger-bar.

Similar reference characters in the different figures of the drawings designate like parts or features of construction.

In construction, the mower may be made in various types, from the lawn mower sizes, to the horse-power sizes, and provided with suitable appliances either for pushing the machine, or for drawing it.

For purposes of description the invention is shown as being embodied in a lawn mower, A and A' designating suitable drive wheels which are employed to carry the mechanism, the wheels having internal gear-teeth $a$ and being mounted on stud-axles $b$ that are attached to disks B and B' which serve as frame-ends. A main frame member C is preferably formed hollow with openings $c$ in its wall and is provided with flanges $d$ and $d'$ at its ends that are secured to the disks B and B' respectively. The middle portion of the member $c$ is provided with a journal-box $e$ that normally is upright or with the axis of its bore substantially perpendicular. A shaft D is mounted rotatively in the journal-box and has an end $f$ extending down beyond the lower end thereof. A bevel gear-wheel E is secured to the upper end of the shaft D upon the journal box $e$. A drive-shaft F is rotatively mounted in suitable bearings in the disks B and B' and has suitable pinions G secured thereto that engage the teeth $a$ of the drive wheels, for properly driving the shaft F. A bevel gear wheel H is secured to the shaft F and is in engagement with the wheel E, for driving the shaft D. Handle parts $g$ and $g'$ are suitably connected to the disks B and B' and are attached to a handle $h$ for pushing the machine.

The finger-bar I is formed as a segment of a circle in top plan, the convex part being provided with a plurality of guard-fingers J that project parallel one to the other, or straight forwardly, the guard-fingers being in other respects of the usual shape and serving as stationary cutting knives, and the convex part between the guard-fingers is preferably beveled to form a cutting edge $i$. The inner or concave part $j$ of the finger-bar is preferably true to a segment of a circle. The guard-fingers have guards $k$ as usual, and the guard-fingers that are situated at one end of the finger-bar have relatively long cutting edges $l$. Slotted arms $m$ and $m'$ are attached to the finger-bar and also adjustably attached to the disks B and B', thus supporting the finger-bar so that it may be adjusted to various heights. A curved rear guard K is connected by ears $n$ to the disks B and B' and may be attached to the ends of the finger-bar if desired.

The sickle-bar L is circular in plan, formed as an endless curved bar attached to arms $x$ to which an axial hub $p$ is attached. If desired, however, a web or disk may be substituted for the arms, the whole member being essentially shaped as a wheel, the hub $p$ being mounted on the end $f$ of the shaft D and held adjustably by means of a set-screw $q$. The sickle-bar conforms to the curved back $j$ of the finger-bar.

Sickles M or M' of suitable number are provided, all of identical shape, each one being provided with a flat shank $r$ by which it is secured to the sickle-bar L, the sickle having a curved end $s$ and operates on the top of the finger-bar I and across the guard-fingers, the top of the sickle-bar and the top of the finger-bar being both in one plane, and the sickles extending across the finger-bar.

At the rear of the machine a guide-roller N is mounted in housings $t$ and $t'$ that are slotted and adjustably attached to the disks B and B' for guiding the finger-bar at uniform height.

Various modifications in the construction of the frame and propelling apparatus may be made, and the rear guard K may be omitted without impairing the usefulness of the machine, and within the scope and intent of the invention. The finger bar may obviously have removable knives, if desired.

In practical use, the mower should be propelled so that the finger-bar will advance ahead of the drive wheels, the gearing described causing the sickles to sweep with great velocity across the stationary cutters or cutting edges of the finger-bar, the sickle-bar or wheel moving in the direction indicated by the dart thereon, about the shaft D, and the grass will be drawn and cut against the sides of the guard-fingers and also against the sharp edge $i$ between the guard-fingers. The mower will operate equally well in tall as in short grass or weeds.

Having thus described the invention, what is claimed as new is—

1. A mower including, in combination, a pair of carrying wheels, a pair of disks mounted in the wheels, a frame member secured fixedly to the pair of disks and having a journal-box midway between the disks, a vertical rotative shaft mounted in the journal-box, a miter gear wheel secured to the shaft and upon the journal-box, a drive shaft mounted in the pair of disks, a miter gear wheel secured to the drive shaft between the disks in engagement with said other gear wheel, driving connections between one of the carrying wheels and said drive shaft, a finger-bar secured to the pair of disks, a sickle-wheel attached to said rotative vertical shaft, and a sickle secured to the sickle-wheel.

2. A mower including, in combination, a pair of carrying wheels, a pair of disks having axles mounted in the wheels and forming parts of a frame, a frame member secured fixedly to the pair of disks and having a journal-box midway between the disks, a vertical shaft mounted in the journal-box, driving connections between the shaft and one of the carrying wheels, a sickle-wheel secured to the shaft beneath the journal box, a curved finger-bar having the end portions thereof attached adjustably to the frame at the disks thereof, and a sickle secured to the sickle-wheel.

3. A mower including, in combination, a pair of carrying wheels, a frame member having a pair of disks attached thereto and mounted in the wheels, each disk having two screw-bolts connected thereto, a vertical shaft mounted rotatively in the frame member midway between the disks, a drive-shaft mounted in the disks above the frame member, driving gearing between the drive-shaft and one of the carrying wheels, driving gearing between the drive-shaft and the vertical-shaft, a sickle-wheel secured adjustably to the vertical shaft, a sickle secured to the sickle-wheel, and a curved sickle-bar having slotted arms receiving the screw-bolts and thereby secured adjustably to the disks, each end of the sickle-bar having one arm extending vertically and the slot therein being vertical.

4. In a lawn mower, the combination of a hollow main frame member having two flanges at opposite ends thereof, each flange having a disk secured thereto and each disk having two screw-bolts connected thereto, carrying wheels connected to the disks, a rotative drive-shaft mounted in the disks above the main frame member, gearing between the drive-shaft and one of the carrying wheels, a rotative vertical shaft journaled in the frame member midway between the disks, a sickle-wheel secured to the vertical shaft below the said frame member, gearing between the drive-shaft and the rotative-shaft, a sickle secured to the sickle-wheel, a curved finger-bar having on each one of the two ends thereof an arm engaging one of the disks and having a slot therein receiving the two screw-bolts, a curved rear guard having ears connected to the disks, a pair of housings attached to the disks, and a roller journaled in the housings.

In testimony whereof, we affix our signatures in presence of two witnesses, on the 9th day of April, 1906.

WILLIAM W. HARE.
HENRY H. HARE.

Witnesses:
WILLIAM K. WILSON,
JAMES B. GARRISON.